Oct. 27, 1959  J. F. BARNES ET AL  2,910,094
TUBE-PROVIDING SHEET
Filed May 31, 1956
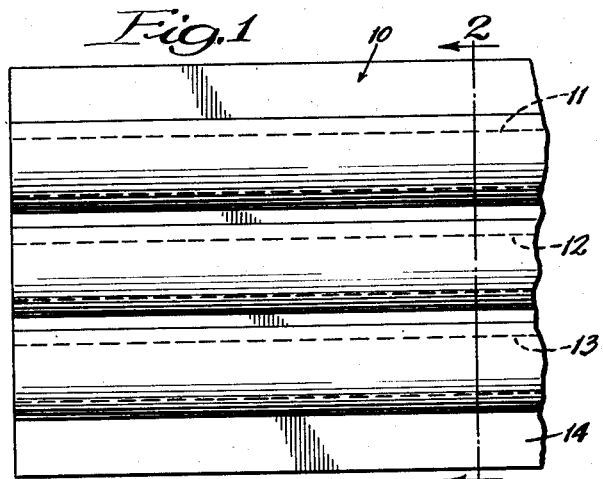
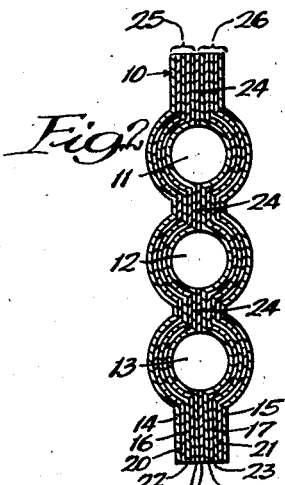
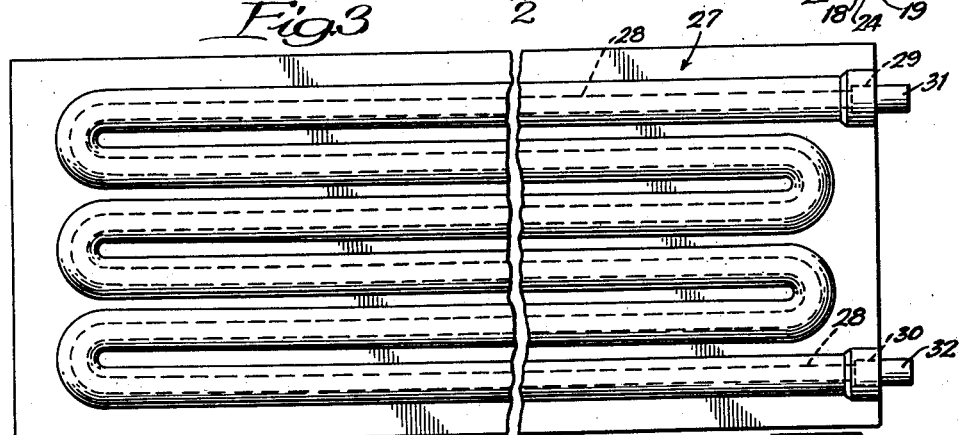
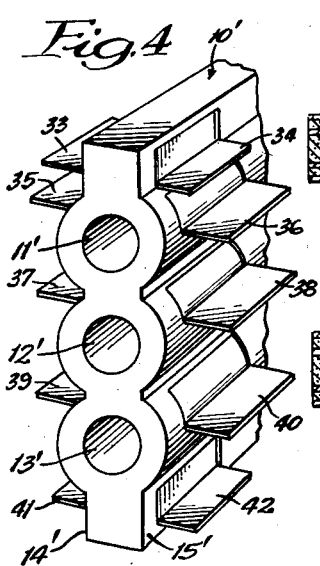
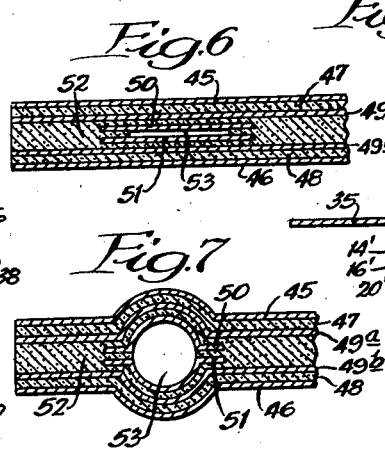
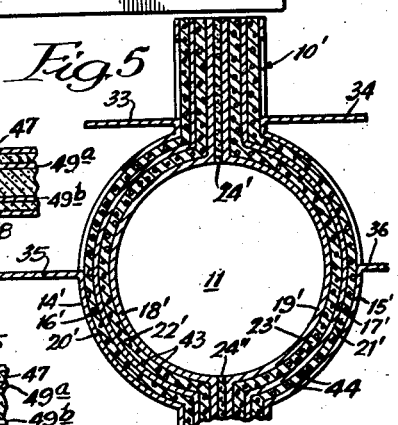
INVENTORS:
James F. Barnes,
Elmer F. Rebholz
and Herman J. Silversher,
BY Dawson, Tilton & Graham,
ATTORNEYS.

United States Patent Office 2,910,094
Patented Oct. 27, 1959

2,910,094

TUBE-PROVIDING SHEET

James F. Barnes, Van Nuys, Calif., Elmer F. Rebholz, St. Louis, Mo., and Herman I. Silversher, Sherman Oaks, Calif., assignors to Foil Process Corporation, Van Nuys, Calif., a corporation of California Application May 31, 1956, Serial No. 588,271

6 Claims. (Cl. 138—87)

This invention relates to tube-providing sheets. Products produced in accordance with this invention will have utility in many applications where it is desired to employ tubing in sheet or strip form. Such tube-providing sheets can be used in various applications in refrigeration, air conditioning, chemical and food processing, etc.

The tube-providing sheets which have heretofore been available have been formed entirely of metal. For some applications, it is desirable to provide lighter weight and less expensive tube-providing sheets, without at the same time sacrificing structural strength and durability. It is therefore a general object of this invention to develop a novel kind of tube-providing sheet, which is lighter and less costly than previous products of this type. A further object is to develop a tube-providing sheet which has greater mechanical workability than those which have been previously known. Further objects and advantages will appear as the specification proceeds.

This invention is shown in illustrative embodiments in the accompanying drawing, in which—

Figure 1 is a plan view of a section of a tube-providing sheet constructed in accordance with this invention; Fig. 2, a transverse sectional view of the tube-providing sheet of Fig. 1, taken on line 2—2 of Fig. 1; Fig. 3, a plan view of a modified tube-providing sheet, showing the entire sheet; Fig. 4, a partial perspective view of a modified form of the tube-providing sheet of Fig. 1; Fig. 5, a fragmentary sectional view of the modified sheet of Fig. 4; Fig. 6, an enlarged fragmentary sectional view of another modified sheet, showing the tube passage collapsed; and Fig. 7, a view similar to Fig. 6, showing the tube passage expanded.

The tube-providing sheet of the present invention can be described as a laminated assembly of superimposed metal foil layers or plies having layers or coatings therebetween of a metal bonding adhesive. One of the adhesive layers is interrupted along a plurality of spaced-apart lines to permit the adjacent metal foil layers to separate along these lines and thereby provide tubes within the assembly. For shipping purposes, the tubes can be opened or closed, that is, the sheets can be shipped flat, and then the tubes can be inflated just prior to installation or use of the tube-providing sheets.

As shown in Figs. 1 and 2, the tube sheet 10 provides a series of longitudinally-extending passages 11, 12 and 13. As shown more clearly in Fig. 2, tube-providing sheet 10 is made up of superimposed metal foil layers, comprising outer layers 14 and 15, and inner layers 16, 17, 18 and 19. Between the metal foil layers are disposed layers of a metal bonding adhesive, including adhesive layers 20, 21, 22, 23 and 24. It will be noted that the central adhesive layer 24 is interrupted along a plurality of spaced-apart lines, and that the adjacent metal foil layers 18 and 19 are separated along these lines to provide the passages 11, 12 and 13. In the illustration given, passages 11, 12 and 13 have walls which are circular in cross section, but it will be understood that the walls of these passages can have various shapes in cross section, such as elliptical, rectangular, square, etc.

Any of the commercially available metal foils can be used in producing tube sheets according to the present invention. These include aluminum, lead, tin, Inconel, stainless steel, copper, titanium, brass, etc. For many applications, aluminum foil will be preferred, either alone or in combination with other metal foils. Where internal or external corrosion resistance is desirable, the inner foil layers, the outer foil layers, or both can be formed of a foil such as stainless steel, Inconel, and titanium foils. Where heat transferring properties are of importance, the outer foil layers can be copper foil, or other metal foil having a high coefficient of heat conduction. The foil layers or sheets can range in thickness from 0.25 mil to as great as 5 mils. Both annealed and hard foils can be used, such as annealed and hard aluminum foils, and the annealed and hard foils can be combined. As a specific example, with reference to the embodiment of Fig. 1, the innermost foil sheets 18 and 19 and the outermost foil sheets 14 and 15 can be formed of stainless steel, Inconel, or titanium foils, while the intermediate foil sheets 16, 17 can be formed of aluminum foil. Alternatively, all of the foil sheets, 14, 15, 16, 17 and 18 and 19 can be formed of aluminum coil.

Various adhesive materials can be employed while still achieving some of the advantages of this invention. Generally, the adhesive should be selected for its capacity to form a strong bond with metals and particularly with aluminum. Suitable adhesives for some purposes include those falling within the classes of thermosetting resin adhesives, thermoplastic resin adhesives, and elastomeric adhesives. The thermosetting resin adhesives are preferred, and particularly the epoxy resin adhesives. Epoxy resin adhesives upon first application and when only partially cured are flexible and resilient, while being curable by the application of heat to a condition of increased rigidity. Moreover, such adhesives function as good bonding agents whether or not they are completely cured to a rigid, infusible condition. A wide range of properties can be achieved with regard to the product either in its final condition or for intermediate processing operations, as described above.

The epoxy resin adhesives can be applied in the form of liquids, solvent solutions, or for short periods of time as hot solutions (melts), or melted B-staged powders. The adhesive is shown being applied as a solvent solution in Fig. 1 of the drawing. When the adhesive is used in the form of a solvent solution, the components of the adhesive can be dissolved in a suitable solvent and this solution applied to the foil. If desired, the adhesive solution can be applied to one surface of a foil sheet and the solvent evaporated therefrom before the second sheet is applied.

The advantages of using epoxy resins include excellent adhesion to clean metal surfaces without complicated surface preparations. The hardening (or polymerization) mechanism is one of addition rather than condensation. This means that no by-products are formed to interrupt the long chain formations. These can be manifested in the formation of gaseous pockets. Pressure must be employed to prevent this in laminates using condensation polymerized products, while only a minimum or contact pressure is adequate to produce a good epoxide film. Another advantage of this mechanism is the low shrinkage factor that does not tend to distort the desired structural dimensions.

One particularly suitable adhesive consists of the reaction product of an epoxy resin and a polyamide. These components can be heated individually to a temperature of 90° to 100° C. to soften them, then mixed and applied. Reaction between the two components gives a cross-linked polymer having characteristics of hardness and flexibility and curing time which vary with the mixing proportions and temperature or curing. The epoxy resins and the polyamide components can be of the types described in our copending application, Serial No. 462,010 filed October 13, 1954, now abandoned. Usually about a 65-35 mixture of epoxy resin and polyamide gives good results. These components can be dissolved in methylethyl ketone or toluene, xylene, or comparable solvents for application as solvent solutions. Among the commercially available epoxy resin adhesives which may be mentioned are the Epon adhesives VI and VII of Shell Chemical and the Araldite adhesives AN-101 and AN-104 of Ciba. However, the preferred adhesives for this invention are not limited to those prepared from the interaction of epoxy resins and polyamides. They may also be made by reacting epoxy resins with amine hardeners and cross-linking agents. These in the main are polyamines of various molecular weights as ethylenediamine, phenylenediamines, etc. Mixtures of polyamide and diamines can also be used.

Thermosetting resin adhesives of the character described are quite desirable for applicants' purposes. However, as indicated, for some applications, thermosetting resin adhesives or elastomeric adhesives might be used. Such adhesives are usually either flexible or rigid upon application, and lack the range of flexibility-hardness properties of epoxy resin adhesives. For example, rubber base adhesives remain flexible, while thermoplastic resin adhesives like polystyrene adhesives are rigid at normal temperatures, although softening on the application of heat. Further, such adhesives are normally unstable in the higher temperature regions, say in excess of 200° F. Some resins, however, such as the phenolic resins, are useful for increasing heat resistance and dimensional stability of the laminate products under heat. Epoxy resins containing amine hardeners have improved stability to heat, while those containing polyamides have better low temperature flexibility characteristics.

The preference for epoxy resin adhesives, as indicated above is based in part on the range of properties obtainable with these adhesives. By combining the epoxy resin with the long-chain polyamides in various proportion, the flexibility of the adhesive can be changed over a considerable range. For example, a mixture of epoxy resin, like Epon 828 (Shell Chemical Company) with Polyamide 115 (General Mills) in approximately equal proportions yields an adhesive of good flexibility when applied and which remains flexible until heat-cured. The inclusion of low molecular weight hardeners, like ethylenediamine in amounts up to 10% by weight of the mixture, tends to reduce the flexibility of the adhesive. Additional modifying resins can also be included. These include such modifiers as elastomeric materials like Thiokol LP3 (Thiokol Chemical Corporation). Inert fillers may also be used for various purposes. Fillers like calcium carbonate, aluminum oxide, and aluminum powder increase the rigidity and decrease the shrinkage of the adhesive layer. The metal powder increases the heat transfer. Fillers like asbestos or glass fibers can be used. The asbestos fibers would increase the heat resistance, while the glass fibers would increase the strength of the adhesive layer. Other types of fillers or inner layers can also be used, such as resin impregnated cloth, paper, etc.

As indicated above, the adhesive formulation, especially in the case of thermosetting resin adhesives like the epoxy resin adhesives can be employed as a means for varying the properties of the tubes and structural shapes. The properties of the tube walls can also be varied by increasing or decreasing the thickness of the foil or by selecting foil which has been tempered to a different degree of hardness and flexibility. The thickness of the adhesive layers between the foil layers will also affect the properties. In general, the thicker the foil layer, the more rigid and less flexible the resulting material. Also, as already indicated, the difference between merely letting the adhesive set at ordinary temperatures and subjecting it to a heat-cure of greater or lesser duration can be taken advantage of to control the relative flexibility or rigidity of the resulting material.

A specific example of a thermosetting epoxy resin adhesive suitable for use in the present invention is formulated as follows: 60 parts by weight of Epon 1001 is dissolved in 30 parts of toluol and 30 parts of methylethyl ketone. A second mixture is formed from 32 parts of Polyamide 115, 11 parts toluol, and 3 parts butanol. 120 parts of the first mixture combined with 46 parts of the second mixture to form an epoxy resin adhesive solution containing 55.4% solids. This adhesive was used as is, but it can be thinned to a different consistency with a mixture of 5 parts toluol and 1 part butanol. If faster drying is desired, additional quantities of methylethyl ketone can be added. In the 55.4% solids concentration, the adhesive mixture has a pot life in excess of 12 hours and this can be increased by adding additional quantities of solvent. Epon 1001 is an epoxy resin manufactured by the Shell Chemical Company, which has an epoxide equivalent of 450 to 525. Polyamide 115 is a condensation product of dilinoleic acid and ethylenediamine produced by General Mills.

As a specific example of a phenolic thermosetting resin adhesive which can be used in practicing the present invention, the following is illustrative: 100 parts of Plyophen 169 is combined with 100 parts by weight of a 10% solution of Butvar B-76 in methylethyl ketone. Plyophen 169 is a phenolformaldehyde resin manufactured by Reichhold Chemicals of White Plains, New York. The product contains 64 to 68% solids, the resin being dissolved in methanol. Butvar B-76 is a polyvinyl butyral resin in a 10% solids solution in methylethyl ketone. It is manufactured by the Monsanto Chemical Company. If desired, Paracril CV can be substituted for Butvar B-76. Paracril CV is a rubbery solid butadiene-acrylonitrile copolymer manufactured by the Naugatuck Chemical Company of Naugatuck, Connecticut. As modifiers for the phenolformaldehyde, soluble nylon or neoprene rubber can be used. Also, the Formvar resins can be substituted for all or part of the Butvar B-76. The Formvar resins are produced by the Shawinigan Chemical Company of Springfield, Massachusetts.

In manufacturing tube-providing sheets according to the present invention, various procedures can be followed. In one procedure, flat sheets would first be formed, then molded into the desired shape, and finally brought together to produce the completed sheet. For example, the structure of Figs. 1 and 2 can be produced by first forming a three-ply foil laminate as a continuous sheet. In this process, the adhesive bonding layers would be in a flexible and deformable state, and would not be completely cured. The sheet laminate would then be cut in lengths of the desired size, and subjected to a die-forming operation to produce matching sections, such as those indicated by the numbers 25 and 26 in Fig. 2. In other words, the flat sheets would have semi-circular recesses formed therein while the laminate sheet was in a soft, flexible condition. As the next step, the matching sections would be brought together to form the completed structure of Figs. 1 and 2, the adhesive being applied between the recesses to provide the interrupted central adhesive layer 24. The completed assembly can then be cured. Alternatively, the flat, laminated sheets can be brought together without being subjected to a die-forming operation, and the bonding adhesive applied in spaced strips so that the uncoated portions of the adjacent metal foil layers can be separated to provide the tubes within the assembly. In this embodiment, the tubes would be expanded or inflated just prior to use.

In laminating the metal foil sheets as described above, the epoxy-polyamide adhesive formulations described previously are preferred. However, when the laminated and molded sections are to be brought together, as described with relation to one embodiment of this invention, it is preferred to use a phenolic adhesive, such as those which have already been described. Another adhesive of this type which might be mentioned is Bloomingdale's FM 47. This adhesive consists of a phenolic-elastomer combination and is manufactured by Bloomingdale Rubber Company of Chester, Pennsylvania.

Fig. 3 shows a modified tube sheet structure 27. As distinguished from the embodiments of Figs. 1 and 2, the tube sheet of Fig. 3 provides a continuous passage 28 extending from port 29 to port 30, these ports being provided with connection plugs 31 and 32, respectively. It will be understood that this type of tube sheet can be built up from a series of alternate metal foil and adhesive layers in the same manner as the embodiment of Figs. 1 and 2. Consequently, it should not be necessary to describe this procedure in detail.

Figs. 4 and 5 shows a modified form 10' of the tube sheet of Figs. 1 and 2. In this modification, the corresponding elements are given the same number except that the numbers are primed. The other foil layers 14' and 15' are provided with a plurality of integral outwardly extending fin portions 33, 34, 35, 36, 37, 38, 39, 40, 41, and 42. Looking at Fig. 5, it will be noted that the intermediate adhesive layers 20, 21, 22 and 23 are somewhat thicker relative to the foil layers than in the embodiment of Figs. 1 and 2. To promote the transfer of heat through these adhesive layers and thereby to the fins 34, 35, etc., metal particles are incorporated in the adhesive layers, as indicated by the numbers 43 and 44 in Fig. 5. Any heat conductive metal particles can be used, such as aluminum particles, ranging in size from −200 mesh down to colloidal size. From five to ten percent of metal particles in the adhesive layers will promote the transfer of heat through the adhesive layers.

Figs. 6 and 7 illustrate a further modification which would be particularly desirable where it is desired to make the tube sheet internally resistant to corrosion. For purpose of orientation, it may be noted that Figs. 6 and 7 correspond with Fig. 5, since these figures also show fragmentary enlarged sectional view of a tube sheet like that of Figs. 4 and 5 or Figs. 1 and 2. Looking now particularly at Figs. 6 and 7, it will be seen that the tube sheet consists of continuous outer foil layers 45 and 46, which are adhesively united through adhesive layers 47 and 48 respectively to inner continuous foil layers 49a and 49b. Between inner foil layers 49a and 49b is positioned foil strips 50 and 51. These foil strips have their outer end portions embedded in a relatively thick adhesive layer 52, which is disposed around and between the outer surfaces of strips 50 and 51 and inner foil sheets 49a and 49b. It will be noted that the inner surface portions of strips 50 and 51 are not adhesively attached, as indicated by space 53 in Fig. 6. In Fig. 7, the space 53 has been enlarged to form a circular tube passage. The tube sheet might be formed and shipped in the flat or collapsed condition illustrated in Fig. 6, and later expanded to form tubular passage such as passage 53, as illustrated in Fig. 7. Expansion of the tube passages could be done in any suitable way, such as by the use of hydraulic pressure. It will be understood, of course, that when the tube passages are to be expanded, the adhesive layers should be relatively flexible. In a preferred embodiment, the continuous foil layers 45, 46, 49 and 50 would be made of aluminum foil, while the inner foil strips 50 and 51 would be made of stainless steel foil. The tube passages would therefore be lined with a corrosion-resistant material (e.g., stainless steel) while the use of the relatively expensive corrosion-resistant material would be kept to a minimum.

The present invention is further illustrated by the following specific examples.

*Example I*

A tube sheet like that shown in Figs. 1 and 2 of the drawing can be produced in the following manner. Sheets of hard aluminum foil ranging from 3 to 5 mils in thickness, e.g., 4 mil sheets, are laminated to produce a two-ply aluminum foil sheet, using a thermosetting epoxy resin adhesive, formulated as follows:

| Ingredients: | Parts by wt. |
| --- | --- |
| Epon 1001 | 30.0 |
| Polyamide 115 | 16.0 |
| Methylethyl ketone | 15.0 |
| Toluol | 20.0 |
| Butanol | 1.4 |

Epon 1001 is an epoxy resin manufactured by the Shell Chemical Company, which has an epoxide equivalent of 450 to 525. Polyamide 115 is a condensation product of dilinoleic acid and ethylenediamine produced by General Mills.

Either simultaneously or subsequently to the lamination just described, a sheet of stainless steel foil of about 2 mils thickness is laminated to one side of the aluminum foil sheets. It will be understood that these laminations can all be carried out at the same time. However, it is preferred to employ somewhat different adhesive formulation for bonding the stainless steel foil to the aluminum foil. This adhesive, in one embodiment, can consist of 83.4 parts of the epoxy resin-polyamide adhesive solution described above combined with 20.0 parts of Butvar B–76. Butvar B–76 in 15% solution of polyvinyl butyral in butanol and is manufactured by the Monsanto Chemical Company.

In making the laminations just described, it will be understood that the adhesive will be applied in a thin layer to both of the metal foil surfaces to be joined, and that these surfaces will then be pressed together in bonding relation, after the solvent has been evaporated from the adhesive layer. Usually, the adhesive will not be cured until after the tube sheet has been completely formed, as will now be described.

The three-ply laminate, having the stainless steel foil on one side and the aluminum foil on the other side, will then be subjected to a roll-forming or die-forming operation to produce complementary sections. The semi-circular channels will be formed into the stainless steel foil side of the laminant. If the sections are symmetrical, as preferred, they can be then joined to produce the tube sheet of Figs. 1 and 2. If the sections are not symmetrical, it will be necessary to form complementary, or mirror image sections, which can then be united. Preferably, in the final bonding operation, the same adhesive is employed as that used to bond the stainless steel foil to the aluminum foil. In one particular embodiment, this would be the adhesive already described in this example.

The completed tube sheet would then be cured. For example, it could be cured for 10 minutes at 300° F.

*Example II*

A heat transfer tube sheet similar to that shown in Figs. 4 and 5 of the drawing can be formed by a procedure similar to that described in Example I. The sheet laminate would consist of one or two inner sheets of hard aluminum foil ranging from 3 to 5 mils in thickness per sheet. The outside layers would be copper or brass foil of 2 to 3 mils thickness per sheet. The laminations would be made with a phenolic-polyvinyl butyral adhesive formulation. A commercial example of such an adhesive is Bloomingdale's FM–47, which is manufactured by Bloomingdale Rubber Company of Chester, Pennsylvania. Another example, is Plycozite of U.S. Plywood Corp., New York, N.Y. In laminating the outer brass or copper foil layers to the inner aluminum foil layers, no adhesive would be applied to the partially cut out segments of the outer foil sheets, which are subsequently to serve as heat transfer fins. These fins, however, would remain in line with the foil layers out of which they are cut until after the tube sheet has been completed.

The laminate sheet could then be die-formed or rolled-formed as described in Example I, to provide the semi-circular passage indentations. Sections of the formed laminate would then be united to provide the completed tube sheet. It will be understood that the passage-providing indentations could be formed in the opposite of the laminate rather than having the fin-providing foil layer on the outside. Then, when the formed sections are brought together, the fins can be folded outwardly, as illustrated in Figs. 4 and 5 of the drawing. The final bonding of the formed sections should be done with the same adhesive used for the laminations, e.g., Bloomingdale's FM-47.

*Example III*

A sheet laminate is formed from 8 sheets of aluminum foil of 3 mils thickness per sheet. The 6 inner sheets of the laminate are annealed or soft foil, while the two outer sheets are hard foil. Adhesive is omitted from the plurality of spaced strips which extend entirely across the laminate. The adhesive used is the epoxy resin-polyamide formulation described in Example I. After curing the laminate for 10 minutes at 300° F., a flexible, flat, inflatable, tube-providing sheet is obtained. The tube passages can then be inflated whenever desired to provide a plurality of passages extending across the tube sheet.

If desired, in forming the laminates, thin strips of polyvinyl alcohol can be used as separators between the inner aluminum foil sheets along the portions thereof to which no adhesive is applied.

*Example IV*

A laminate is formed from 3 sheets of 2-mil hard aluminum foil, using the epoxy resin-polyamide adhesive described in Example I. Two sections of this laminate are then brought together and formed around a plurality of spaced brass tube sections. The inner foil layers will be united to each other and also to the brass tube by suitable adhesive such as Bloomingdale's FM-47, described in Example II.

*Example V*

A tube sheet like that illustrated in Figs. 6 and 7 of the drawing is produced by first forming a laminate of 2 or 3 sheets of aluminum foil. Narrow strips of stainless steel foil are then laminated in spaced parallel relation to one outer surface of the aluminum foil laminate. Sections of the composite laminate thus obtained are then brought together with the stainless steel strips facing each other. Adhesive is applied only to the outer edges of the stainless steel strips and to the intervening aluminum foil surfaces. After the lamination is completed, the tube sheet can be inflated.

In this embodiment, 3-mil, soft aluminum foil sheets can be used, together with 2-mil stainless steel foil strips. The aluminum foil sheets could be laminated with the epoxy resin-polyamide adhesive described in Example I. The stainless steel strips would be laminated to the aluminum foil with the epoxy resin-polyamide-polyvinyl butyral adhesive formulation which is also described in Example I. The final lamination of the sections could be made with the Bloomingdale FM-47 adhesive described in Example II.

As a further modification, the composite aluminum foil laminate and stainless steel strips can be die-formed or roll-formed, as described in Example I, and then the formed sections can be united. In this modification, the adhesives employed would be the same as those already described in the present example.

While in the foregoing specification this invention has been described in relation to specific embodiments thereof and many details have been set forth for purpose of illustration, it will be apparent to those skilled in the art that the invention is susceptible to other embodiments and that many of the details described herein can be varied without departing from the basic concepts of the invention.

We claim:

1. A tube-providing sheet, comprising a laminated assembly of superimposed metal foil layers having layers therebetween of a metal bonding adhesive, said assembly containing at least four metal foil layers and at least three adhesive layers, none of said foil layers having a thickness of over 5 mils, one intermediate adhesive layer being interrupted along a plurality of spaced-apart lines to permit the adjacent metal foil layers to separate along said lines to provide tubes within said assembly.

2. The tube-providing sheet of claim 1 in which the foil sheets immediately adjacent said interrupted adhesive layer are selected from the group consisting of stainless steel, Inconel, and titanium foils.

3. A tube-providing sheet, comprising two matching sections each comprising a laminated assembly of a plurality of superimposed metal foil sheets having layers therebetween of a metal-bonding adhesive, none of said metal foil sheets having a thickness of over 5 mils, said sections having a plurality of opposed recesses formed therein, said recesses extending along said sheet to provide open passages between said sections, and the inner surface portions of said sections between said passages being adhesively bonded together.

4. The tube-providing sheet of claim 3 in which at least one of the two outermost layers of metal foil provide a plurality of integral outwardly-extending fin portions.

5. The tube-providing sheet of claim 3 in which at least some of the outer foil sheets of said matching sections are aluminum foil, and the innermost foil sheets of said sections which lie around said recesses are stainless steel foil.

6. The tube-providing sheet of claim 5 in which said sheets of stainless steel foil are interrupted between said recesses so that said passages are lined with a plurality of separate strips of stainless steel foil.

References Cited in the file of this patent

UNITED STATES PATENTS

| | | |
|---|---|---|
| 2,039,593 | Hubbuch et al. | May 5, 1936 |
| 2,396,522 | Modine | Mar. 12, 1946 |
| 2,642,412 | Newey et al. | June 16, 1953 |
| 2,651,589 | Shokal et al. | Sept. 8, 1953 |
| 2,653,889 | Hager et al. | Sept. 29, 1953 |
| 2,691,208 | Brennan | Oct. 12, 1954 |
| 2,705,223 | Renfrew et al. | Mar. 29, 1955 |
| 2,707,708 | Wittcoff | May 3, 1955 |
| 2,752,129 | Modine | June 26, 1956 |